Patented Oct. 4, 1949

2,483,392

UNITED STATES PATENT OFFICE 2,483,392

SUBSTITUTED ETHYLENES AND PROCESS OF MAKING SAME

Jules Meyer, Basel, and Franz Ackermann, Binningen, Switzerland, assignors to Ciba Limited, Basel, Switzerland, a Swiss firm No Drawing. Application December 12, 1946, Serial No. 715,646. In Switzerland, December 18, 1945

10 Claims. (Cl. 260—240)

1

According to the present invention new substituted ethylenes are made by treating an ethane compound containing the atomic grouping

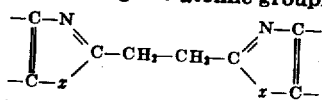

in which the $x$'s represent nitrogen, oxygen or sulphur and at least one $x$ represents oxygen or sulphur, or a substitution product or salt of such compound, at a raised temperature with a dehydrogenating agent.

As products containing the above mentioned atomic grouping there may be used, for example, ethanes of the formula

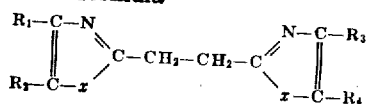

wherein $x$ has the already indicated meaning, and $R_1$, $R_2$, $R_3$ and $R_4$ stand for hydrogen, aliphatic radicals, aromatic radicals or radicals supplementing the $>C=C<$ group in at least one of the heterocyclic rings to form a nucleus of the benzene series, furthermore also salts thereof. Compounds of the formula

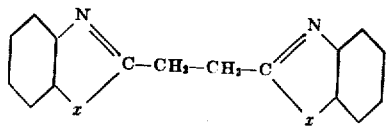

are examples of such products of the above mentioned formula

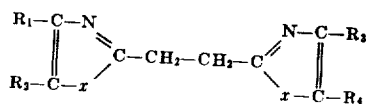

wherein $R_1$ and $R_2$, on the one hand, and $R_3$ and $R_4$, on the other, supplement the $>C=C<$ group of the heterocyclic rings to a nucleus of the benzene series, in the present case to an unsubstituted benzene nucleus.

As ethane compounds containing the aforesaid atomic grouping, when $x$ represents sulphur, there may be used $\alpha:\beta$-di-[thiazolyl-(2)]-ethane or substitution products thereof such as $\alpha:\beta$-di-[4-methyl-thiazolyl-(2)]-ethane, $\alpha:\beta$-di-[4-ethyl-thiazolyl-(2)]-ethane, $\alpha:\beta$-di-[4:5 - di - phenyl-thiazolyl-(2)]-ethane, $\alpha:\beta$ - di - [benz - thiazolyl-(2)]-ethane or $\alpha:\beta$-di-[benzthiazolyl-(2)]-ethanes containing a substituent in the benzene nucleus, for example, a halogen atom or a nitro- or methoxy-group.

2

These compounds represent examples for ethanes of the formula

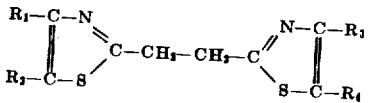

wherein $R_1$, $R_2$, $R_3$ and $R_4$ have the above given meaning.

As ethanes containing the aforesaid atomic grouping when $x$ represents oxygen, there may be used $\alpha:\beta$-di-[oxazolyl-(2)]-ethane or substitution products thereof such as $\alpha:\beta$-di-[benzoxazolyl-(2)]-ethane, or $\alpha:\beta$-di-[benzoxazolyl-(2)]-ethanes containing as a substitutent in the benzene nucleus, for example, a halogen atom or a nitro- or methoxy-group.

These compounds represent examples for ethanes of the formula

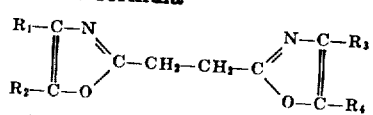

As starting materials there come into consideration also asymmetrically substituted ethanes containing the aforesaid atomic grouping, when, for example, one $x$ represents sulphur and the other nitrogen.

As salts of the substituted ethanes described above there may be used, for example, hydrochlorides or sulphates thereof.

As dehydrogenating agents there come into consideration, for example, mild oxidising agents. Examples of such agents are: Compounds of divalent mercury such as mercuric acetate or mercuric oxide; potassium permanganate or pyrolusite; copper oxide or copper sulphate; hydrogen peroxide, selenium dioxide; platinum oxide; and finally organic compounds having an oxidising action such as nitro-compounds, for example, nitrobenzene. For the dehydrogenation of thiazoles there may also be used ferric salts, such as ferric chloride. The elements selenium and sulphur constitute a further group of dehydrogenating agents.

Lastly, there may also be mentioned as dehydrogenating agents dehydrogenation catalysts, for example, finely divided nickel, copper, platinum or palladium, used as such or supported on a carrier.

The most suitable dehydrogenating agents are, however, mild oxidising agents, especially mercuric salts. The treatment with the dehydrogenating agent is carried out at a raised temperature, preferably at a temperature exceeding 80° C., but lying below the decomposition point of the starting materials, for example, at 80–150° C., advantageously in the presence of a solvent for the above described ethane compounds, for example, with the addition of glacial acetic acid, a dilute mineral acid or water (provided the starting materials contain sulphonic acid groups). Thus, for example, mercuric acetate, which is soluble in glacial acetic acid, can be caused to act upon a solution of the substituted ethane, for example, at 100–150° C. In this manner dehydrogenation products containing mercury, probably complex compounds, are generally obtained, and from which the combined mercury can be eliminated in the usual manner, for example, by treatment with an acid or an alkali. If, however, the dehydrogenation product is sensitive to acid, as for example in the case of oxazoles, the decomposition of the mercury compound is advantageously brought about by means of an alkali.

The products, when in a dissolved or finely dispersed condition, exhibit a more or less pronounced fluorescence and also possess a more or less marked affinity for cellulose fibres. By virtue of these properties the products are suitable, for example, for identifying materials, for instance, by printing marks thereon which are visible when viewed by light of short wave length.

The products obtained by this process can be designated as substituted ethylenes containing the following atomic skeleton

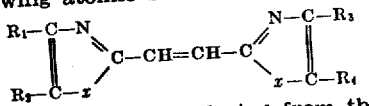

wherein $x$ is a member selected from the group consisting of O, S and NH, and $R_1$, $R_2$, $R_3$ and $R_4$ stand for a member selected from the group consisting of hydrogen, aliphatic radicals, aromatic radicals, and radicals supplementing the heterocyclic >C=C< group of at least one of the rings to form a nucleus of the benzene series and wherein at least one of the $x$'s represents a member selected from the group consisting of O and S. The free bases as well as their salts contain the same atom skeleton; in the formation of salts with acids merely the acid is added to the tribasic N-atoms which are converted from the trivalent state into the penta-valent state.

As examples for the products obtained according to this process there may be mentioned, for instance, products having the following atomic skeleton

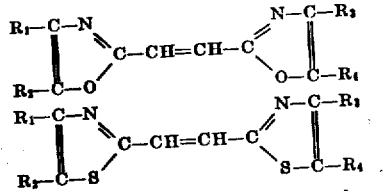

wherein $R_1$, $R_2$, $R_3$ and $R_4$ have the above given significance.

Among the α:β-di-[thiazolyl-(2)]-ethanes hereinbefore mentioned as starting materials, α:β-di-[4-methyl-thiazolyl-(2)]-ethane and also α:β-di-[benzthiazolyl-(2)]-ethane are known. The α:β-di-[thiazolyl-(2)]-ethanes which have not hitherto been described can easily be prepared by methods analogous to those used for making similar known compounds.

The α:β-di-[benzoxazolyl-(2)]-ethanes serving as starting materials are prepared, for example, by heating an ortho-aminophenol with succinic acid or a functional derivative thereof at 170–180° C. with the exclusion of air.

The following examples illustrate the invention, the parts being by weight:

Example 1

1.6 parts of α:β-di-[4-methyl-thiazolyl-(2)]-ethane of the formula

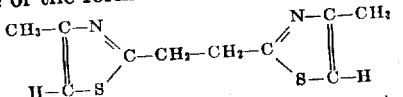

are heated for 6 hours on the boiling water bath with 1.8 parts of concentrated hydrochloric acid, 25 parts of water and 13 parts of ferric chloride. During this period small quantities of solid constituents separate. About 80 parts of water are added, the solid constituents are crushed, and a solution of sodium carbonate is added until an alkaline reaction is obtained. The solution is then extracted with ether, and the solvent is removed by distillation. After a short time the precipatated oily residue crystallises. The residue consists of not wholly pure α:β-di-[4-methyl-thiazolyl-(2)]-ethylene of the formula

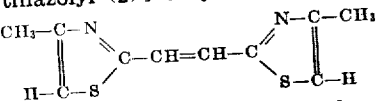

By squeezing the residue on clay and recrystallising from petroleum ether, the pure ethylene derivative is obtained in the form of a yellowish powder.

An alcoholic solution of the reaction product gives an intense blue fluorescence in ultra-violet light. Instead of with ferric chloride, the dehydrogenation can also be brought about with finely dispersed nickel in the heat. Instead of the above mentioned substituted ethane there may also be used α,β-di-[benzthiazolyl-(2)]-ethane, furthermore an α,β-di-[benzthiazolyl-(2)]-ethane methylated in the benzene nucleus.

Example 2

2.2 parts of α:β-di-[4-methyl-thiazolyl-(2)]-ethane are dissolved in 10 parts of glacial acetic acid, and the solution is mixed with a solution of 6.8 parts of mercuric acetate in 15 parts of glacial acetic acid. The mixture is then heated to gentle boiling for 2 hours. At the end of this period the solvent is removed by distillation under reduced pressure. The residue, which is a mercury compound of the dehydrogenation product, is boiled with an aqueous alcoholic solution of sodium carbonate in order to split off mercury, and the whole is filtered hot. α:β-di-[4-methyl-thiazolyl-(2)]-ethylene separates from the filtrate in the form of light yellowish needles, alcoholic solutions of which give an intense blue fluorescence in ultra-violet light.

Example 3

A solution of 3 parts of the condensation product of ortho-amino-thiophenol and succinic acid of the formula

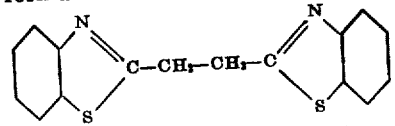

described below in 20 parts of glacial acetic acid is mixed with a solution of 5.7 parts of mercuric acetate in 20 parts of glacial acetic acid, and the mixture is gently boiled for one hour while stirring. The solvent is then removed by distillation under reduced pressure, and the residue is taken up in chloroform. The solution is filtered, and the solvent is removed from the solution by distillation. The residue is extracted by boiling with hydrochloric acid of 10 per cent. strength. Upon cooling, α:β-di-[benzthiazolyl-(2)]-ethylene of the formula

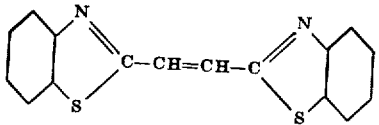

separates from the hydrochloric acid solution in the form of a yellow powder. For the purpose of further purification the powder so obtained is dissolved in as small a quantity of chloroform as possible and alcohol is added. After allowing the whole to stand for a short time the new compound separates in the form of slightly yellowish crystals.

The condensation product used above as starting material is advantageously prepared in the following manner:

5 parts of succinic acid are heated with 15 parts of ortho-aminothiophenol at 170–175° C. for 10 hours with the exclusion of air. After cooling, the material is heated with a solution of caustic soda of 10 per cent. strength in order to remove starting material which is still present, and the whole is then filtered and the filter residue washed with water until the washings give a neutral reaction.

The pale yellowish residue is further purified by means of dilute hydrochloric acid by way of the dihydrochloride. Almost colourless crystals are obtained which are soluble in hot alcohol.

Example 4

A solution of 2.5 parts of α:β-di-[4:5-di-phenylthiazolyl-(2)]-ethane in 50 parts of glacial acetic acid are mixed with a solution of 3.4 parts of mercuric acetate in 8 parts of glacial acetic acid, and the mixture is gently boiled for 2 hours. The solvent is then removed by distillation under reduced pressure, the residue is treated with a solution of ammonia, and the liberated base, after being dried, is extracted by boiling with 150 parts of chlorobenzene and filtered hot. Upon evaporation of the chlorobenzene α:β-di-[4:5 - diphenyl - thiazolyl-(2)] - ethylene of the formula

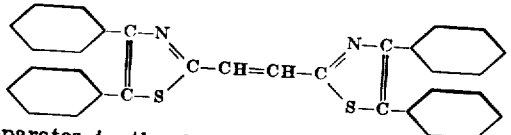

separates in the form of yellow crystals, alcoholic solutions of which give an intense blue fluorescence in ultra-violet light.

The α:β-di-[4:5-diphenyl-thiazolyl-(2)]-ethane used as starting material can be prepared in the usual manner from the thioamide of succinic acid and α-chlorobenzoin in absolute alcohol.

Example 5.

A solution of 2.6 parts of α:β-di-[benzoxazolyl-(2)]-ethane of the formula

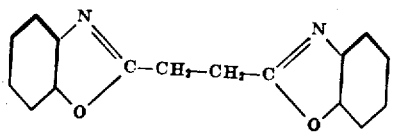

in 10 parts of glacial acetic acid is gently boiled with a solution of 6.8 parts of mercuric acetate in 15 parts of glacial acetic acid for one hour. The solvent is then removed by distillation under reduced pressure. The residue is extracted by boiling with 100 parts of chloroform, filtered, and the solvent is removed by distillation. The residue so obtained is boiled for a short time with an aqueous-alcoholic solution of sodium carbonate for the purpose of separating the dehydrogenation product which is free from mercury, the whole is filtered, and the filter residue is washed until the washings have a neutral reaction. For the purpose of further purification the resulting α:β-di-[benzoxazolyl-(2)]-ethylene of the formula

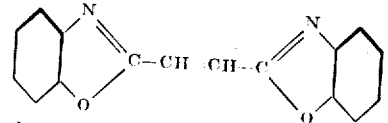

is recrystallised from alcohol, whereupon it is obtained in the form of a brick red powder.

The α:β-di-[benzoxazolyl-(2)]-ethane used as starting material may be prepared in the following manner:

A mixture of 109 parts of ortho-aminophenol and 30 parts of succinic acid is heated for 18 hours at 170–180° C. with the exclusion of air. The whole is allowed to cool, the resulting material is pulverised, the pulverised material is stirred for a short time with a caustic soda solution of 5 per cent strength, the whole is filtered, and the filter residue is washed with cold water until the washings have a neutral reaction. The resulting brownish powder is recrystallised several times from dioxene or chlorobenzene with the addition of animal charcoal. Pale crystals are obtained which are insoluble in water. α, β-di-[oxazolyl-(2)]-ethane and α, β-di-[benzoxazolyl-(2)]-ethane methylated in the benzene nucleus may also be hydrogenated in similar manner. Instead of mercuric acetate there may also be used another mild oxidizing agent, for example, mercuric oxide.

Example 6

2.5 parts of α-[benzimidazyl-(2)]-β-[benzoxazyl-(2)]-ethane are dissolved hot in 25 parts of glacial acetic acid, and mixed with a solution of 6.8 parts of mercuric acetate in 15 parts of glacial acetic acid, and then the whole is heated for 2½ hours at 140–145° C. The solution is decanted from metallic mercury which precipitates, and the solvent is removed by distillation under reduced pressure.

The brown residue is extracted by boiling with 1000 parts of alcohol and 30 parts of concentrated ammonia solution. Undissolved constituents are then removed by filtration.

The filtrate is evaporated to dryness leaving a brown powder which dissolves in alcohol to give an intense pale blue fluorescence.

Example 7

2.4 parts of α-[benzthiazyl-(2)]-β-[benzimidazyl-(2)]-ethane dissolved in 50 parts of glacial acetic acid are heated with a solution of 6 parts of mercuric acetate in 15 parts of glacial acetic acid for about ½ hour at 140° C. The solution acquires a brown colour and metallic mercury separates. The whole is decanted to remove precipitated mercury, and the solvent is removed by heating under reduced pressure.

The residue is extracted by boiling with 1000 parts of alcohol and 30 parts of concentrated ammonia solution. The solution is then filtered to remove insoluble constituents, and the filtrate is evaporated to dryness.

The resulting dehydrogenation product is a brownish powder, which dissolves in alcohol to give a pale brown fluorescence.

What we claim is:

1. Process for the manufacture of a substituted ethylene containing the atomic skeleton

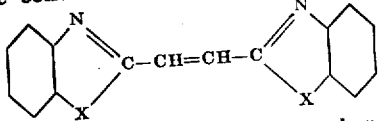

wherein both X's are identical members of the group consisting of O and S, which comprises heating a member selected from the group consisting of ethanes of the formula

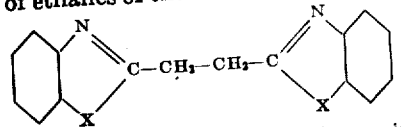

wherein X has the above mentioned meaning, and their salts with a dehydrogenating agent at a temperature exceeding 80° C., but lower than the decomposition temperature of the parent material.

2. Process for the manufacture of a substituted ethylene containing the atomic skeleton

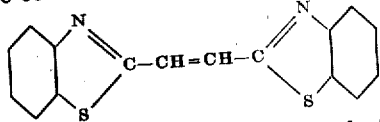

which comprises heating a member selected from the group consisting of the ethane of the formula

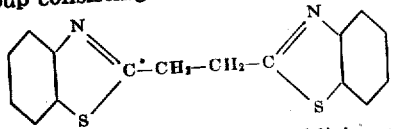

and a salt thereof with a mild oxidizing agent at a temperature exceeding 80° C. but lower than the decomposition temperature of the parent material.

3. Process for the manufacture of a substituted ethylene containing the atomic skeleton

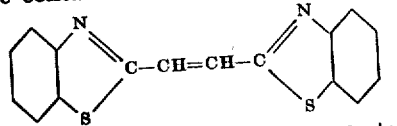

which comprises heating a member selected from the group consisting of ethanes of the formula

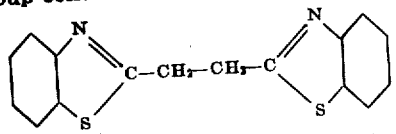

and their salts with a water-soluble ferric salt in the presence of a solvent for the substituted ethane at a temperature exceeding 80° C. but lower than the decomposition temperature of the parent material.

4. A substituted ethylene containing the atomic skeleton

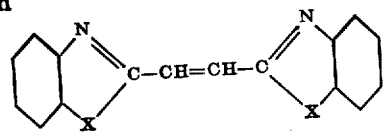

wherein both X's are identical members of the group consisting of O and S.

5. Process for the manufacture of a substituted ethylene containing the following atomic skeleton

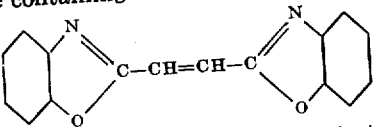

which comprises heating a member selected from the group consisting of the ethane of the formula

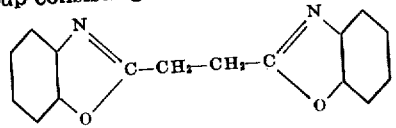

and a salt thereof with a mild oxidizing agent at a temperature exceeding 80° C. but being lower than the decomposition temperature of the parent material.

6. Process for the manufacture of a substituted ethylene containing the following atomic skeleton

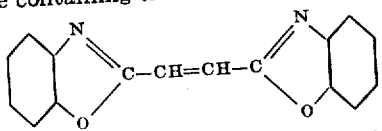

which comprises heating a member selected from the group consisting of the ethane of the formula

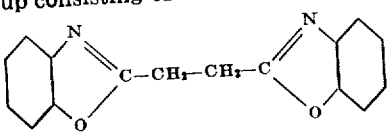

and a salt thereof with a mercuric salt at a temperature exceeding 80° C. but being lower than the decomposition temperature of the parent material.

7. Process for the manufacture of a substituted ethylene containing the following atomic skeleton

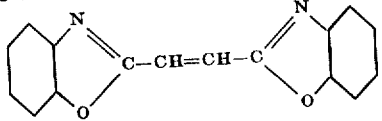

which comprises heating the ethane of the formula

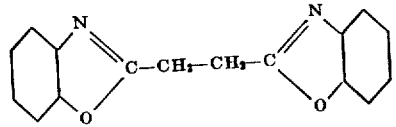

in presence of acetic acid with mercuric acetate at a temperature ranging from 80–150° C.

8. Process for the manufacture of a substituted ethylene containing the following atomic skeleton

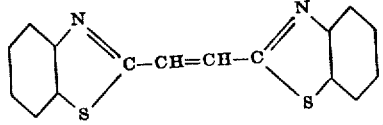

which comprises heating the ethane of the formula

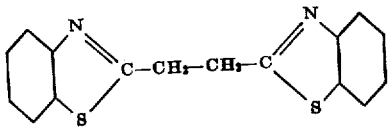

in presence of acetic acid with mercuric acetate at a temperature ranging from 80–150° C.

9. The substituted ethylene of the formula
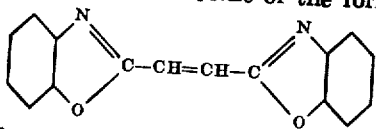
10. The substituted ethylene of the formula
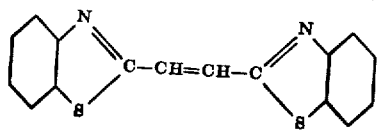
JULES MEYER.
FRANZ ACKERMANN.
REFERENCES CITED
The following references are of record in the file of this patent:
Richter, "Textbook of Organic Chemistry," John Wiley & Son, 1938, page 633.
Lehr, Helviticu Chemi. Act., vol. 28 (1945), pp. 1281 and 1282.
Chem. Abstracts, vol. 40, page 21,469.